Dec. 16, 1941. R. D. CLEMSON 2,266,307
MOWER
Filed Feb. 14, 1939 2 Sheets-Sheet 2
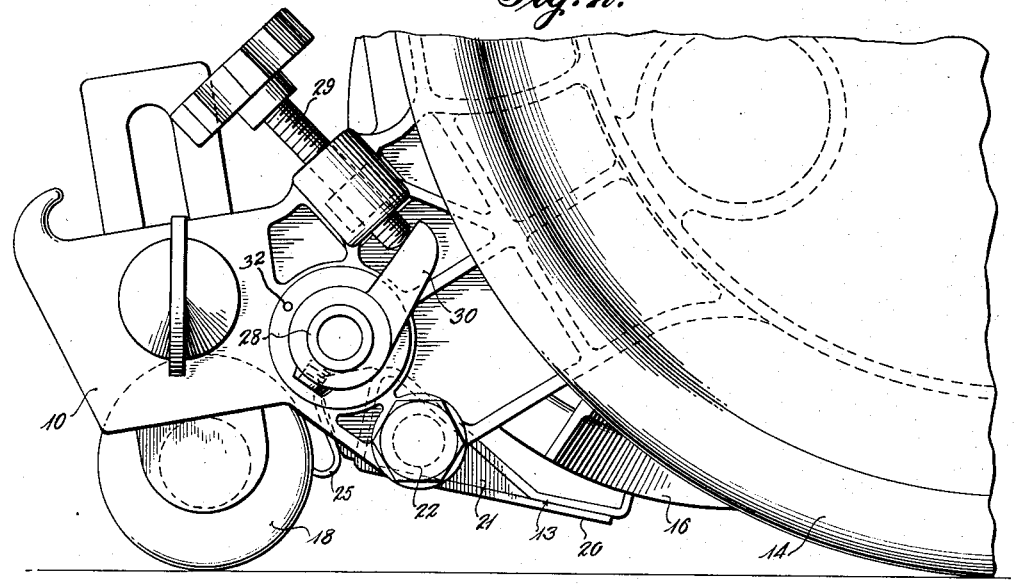
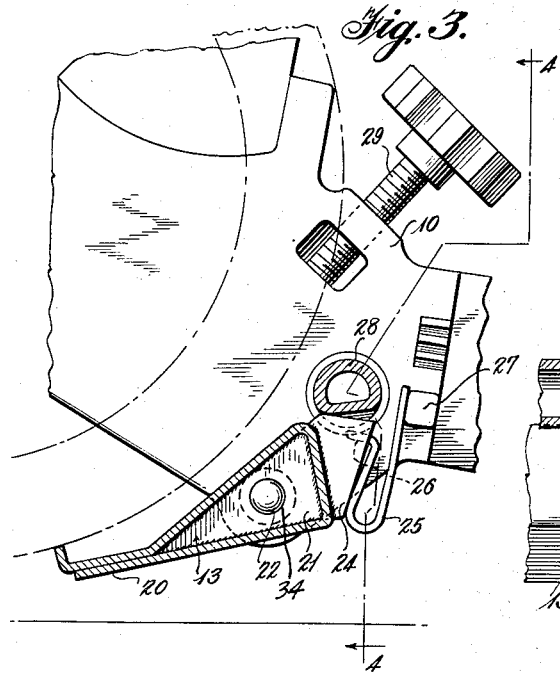
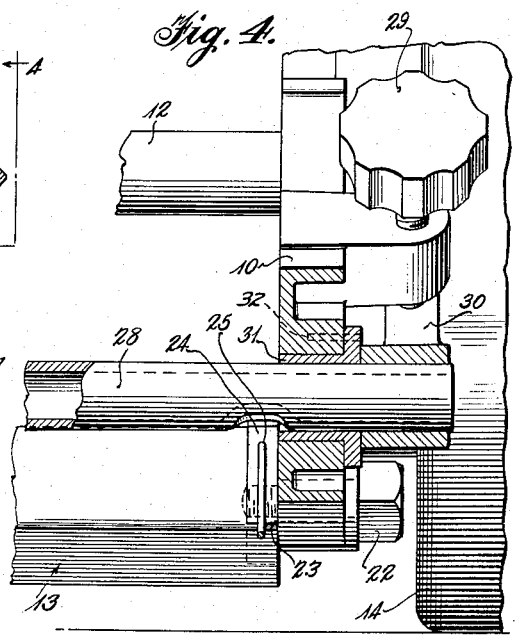
Inventor
Richard D. Clemson Patented Dec. 16, 1941

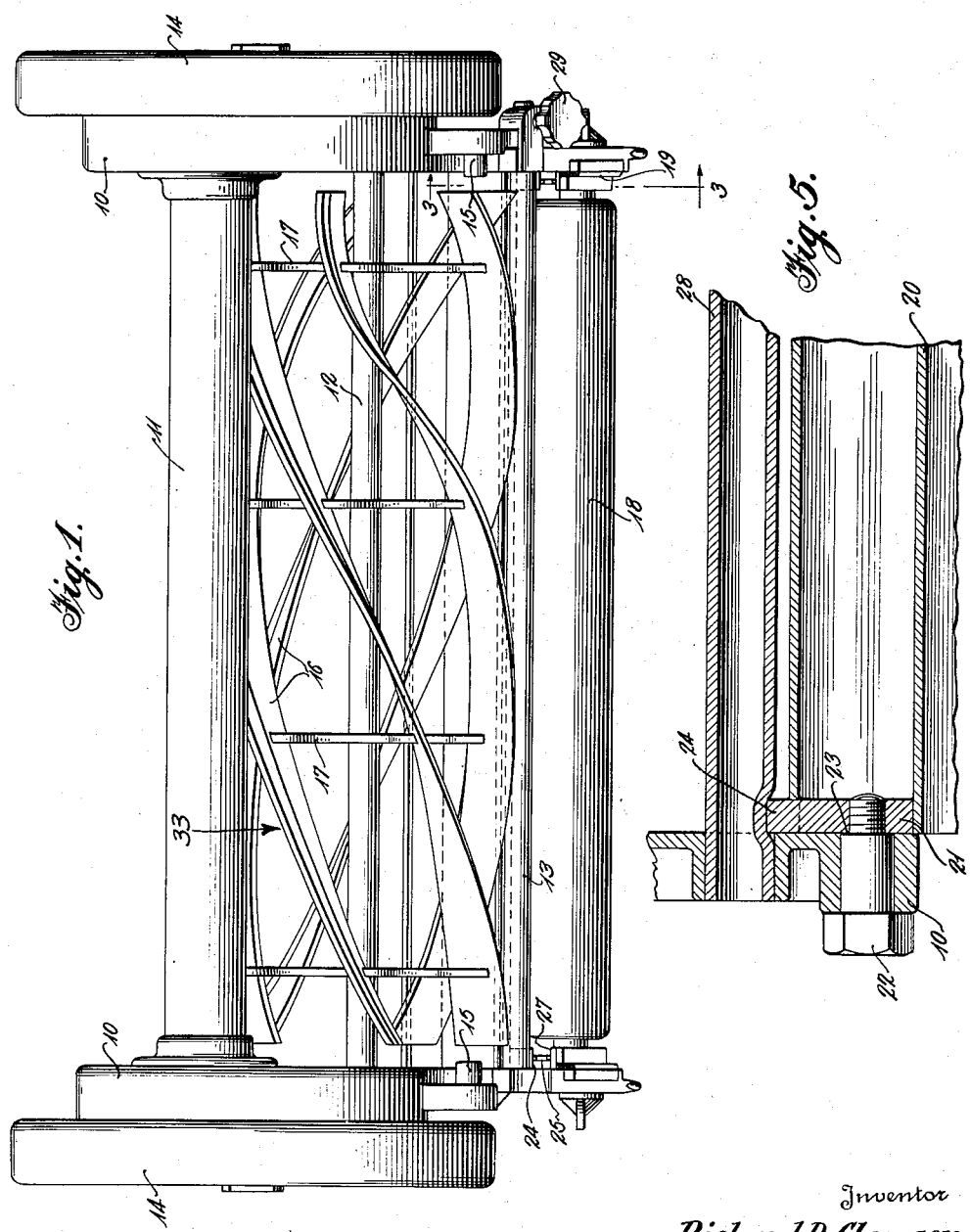

2,266,307

UNITED STATES PATENT OFFICE 2,266,307

MOWER

Richard D. Clemson, Middletown, N. Y., assignor to Clemson Bros., Inc., Middletown, N. Y., a corporation of New York Application February 14, 1939, Serial No. 256,376

10 Claims. (Cl. 56—294)

This invention relates to rotary reel type mowing machines and more particularly to a device for adjusting the cutting members of such a mowing machine especially by modifying the pressure of a bed knife with respect to the spiral fly knives of a rotary cutting reel.

The type of lawn mower to which the present device is adapted has a frame carrying a wheel at each end thereof and a shearing mechanism disposed between and operated through a gear train from said wheels or by other suitable driving mechanism. A bed knife is mounted on the frame in such a manner as to be spaced a short distance above and parallel to the surface on which the wheels rest; while a cutting reel carrying a plurality of spiral fly knives about the periphery thereof is rotatable to bring the fly knives in successive shearing contact with the bed knife.

If they are to produce a clean, healthy cut, which is important with lawn mowers, it is essential that the knives contact with a reasonable pressure throughout their entire length. If the pressure is too light various types of grass or weeds may not be cut and if it is too heavy, the machine operates with excessive friction, tiring the operator and tending to tear the lawn by dragging the wheels and moreover the blades are more easily damaged.

It has been the practice prior to my invention to adjust the mower always for the maximum pressure which may be required by any material encountered during its use. In my prior copending application, now U. S. Patent No. 2,183,544, issued December 19, 1939, I have described a self-adjusting mower in which the bed knife is held against the reel only by a light pressure and is closed more tightly against the reel by its own reaction to the cutting of more stubborn materials. The present invention is an improvement within the broad principle of my prior invention, in that I now combine a manually adjustable positive limiting device with the self-adjusting bed knife. In this way I have found that, for ordinary cutting, the initial setting may be so light that the machine operates almost without drag and without noise. When the blades wear or when a lawn is being cut which is of such nature that greater initial pressure is required, the necessary correction is made by the single simple adjustment of my present invention.

In mowers as commonly known to the prior art, adjustment required such high pressure that it could be done only with tools, and it was common practice to use opposed screws or bolts at each end of the bed knife of such pitch as to produce an appreciable twisting of the bed knife. Adjusting by means of these devices was not only slow and laborious, but could be done properly only by an expert. In contrast to this, my invention provides a single simple manual adjustment conveniently placed so that it can be used while the machine is in operation. Thus, even the most inexperienced can attain the most perfect adjustment merely by watching the results as the adjustment is tightened or slacked off during operation.

Such simple adjustment is feasible, without twisting the bed knife, because I use it only for the minimum limiting pressure and produce such additional pressure as may be required for cutting tough weeds, etc., directly when and where it is required by the self-adjusting reaction to cut. With sufficiently rigid parts or with use of mechanical advantage as suggested below, however, my construction may be applied even where the "reaction" self-adjustment is not used.

For the proper operation of a mower using my present invention it is very important that the bed knife edge and the fly knife edges should remain accurately coinciding with the proper geometric surface of the reel. Any wrenching of the frame may throw the bed knife edge out of alignment, any permanent deformation of the fly knives or bed knife may cause them to clash and dull or to fail to contact properly under the light pressure of the initial adjustment. I find it advantageous, therefore, to use a perfectly rigid frame secured in this case by the wide tubular tie bar and by the reel and bed knife mountings as more particularly described and claimed in my application Serial No. 148,838, filed June 18, 1937, a resilient bed knife with longitudinally rigid edge as described and claimed in my copending application, now U. S. Patent No. 2,183,548, issued December 19, 1939, and the unstressed fly knives as described in my copending application, now U. S. Patent No. 2,185,833, issued June 2, 1940.

It is an object of the invention, therefore, to provide an adjusting device in mowing machines which will make practicable the operation of such machines with a minimum of drag, noise and wear. Another object is to provide an adjustment which is simple and convenient to operate and which will not require any special skill. Another object is to provide an adjustment which can be operated while the mowing machine is in operation whereby the point of optimum adjustment may be determined by actual results. Another object of the invention is to provide a simple and inexpensive mechanism.

In the drawings:

Fig. 1 represents a mower unit embodying the principles of this invention;

Fig. 2 is a fragmentary end elevation thereof;

Fig. 3 is a fragmentary section on line 3—3 of Fig. 1;

Fig. 4 is a fragmentary section on line 4—4 of Fig. 3; and

Fig. 5 is a fragmentary section of the bed knife mounting at one end of the mower unit illustrated in Fig. 1.

With particular reference to Fig. 1 the mower unit comprises two end frame members 10 maintained in proper position relative to each other by a tie rod 11 in cooperation with the reel axle 12 and the bed knife mounting 13. Wheels 14 mounted in bearings (not shown) on the frame members 10 are connected to the axle 12 by a gear train (not shown) within the frame members to cause rotation of the reel when the machine is operated. Lugs 15 are provided on the frame members 10 for connection of the handle thereto. The reel 3 which may be of conventional type bears a plurality of fly knives 16 joined to the reel axle 12 in spaced relation by the spiders 17. A ground roller 18 is mounted on the rear end of the mower unit and provided with a suitable adjusting device 19.

While the reel and bed knife may be of any suitable construction I prefer that the spiders 17 shall be cast in contact with the axle 12 and the knives 16 in the manner described and claimed in my copending application, Serial No. 148,836. It is also preferred that the bed knife shall be formed of a strip of cold rolled steel 20 bent in the form shown in Fig. 3 and having cast or welded end-plugs 21 at each end thereof, as described and claimed in my copending application, Serial No. 256,377, filed February 14, 1939. The plugs 21 are provided with threaded holes 34 to receive bolts 22 passing through the frame member 10 and each having a shoulder 23 so positioned that when the bolt is tightened down it will be freely rotatable with respect to frame member 10. The bed knife mounting is provided with a rearwardly extending portion or projection 24 which acts as a cam follower in the manner to be hereinafter more fully described.

It is preferred that some resilient means shall be provided to cause rotation of the bed knife mounting in a direction to increase the clearance between the cutting edge of the bed knife and the fly knives 16 contacting therewith. In the embodiment here shown the resilient means is in the form of a spring 25, one end of which is inserted into an opening 26 in the end of the bed knife and the other end of which bears on a lug 27 on the corresponding frame member 10.

As noted above the bed knife pivots are preferably so positioned that the action of cutting grass or similar material will cause a reaction which will push the bed knife in toward the reel with a toggle action. This occurs when the bed knife pivot axis is in either of the two opposite quadrants which are below the tangent to the reel through the bed knife shearing edge and behind said edge, or above said tangent and ahead of said edge, that is to say, when the angle at the bed knife edge between the pivot axis of the bed knife mounting and the axis of the reel, measured in the same direction as the rotation of the reel, has a positive tangent. Ordinarily this pivot will be positioned in the lower quadrant, as in the example shown in the drawing and described above; but the pivot may be in the upper quadrant, for example as shown in Figs. 1 and 2 of my prior U. S. Patent No. 2,183,544. The only manual adjustment that needs to be provided therefore is a means for pressing the bed knife edge sufficiently tightly against the rotating reel that the grass which is too tender to give an effective reaction as above noted may, nevertheless, be sheared with a clean healthy cut.

This adjustment can be accomplished according to my invention by cams, screw or other high mechanical advantage devices. In the example shown, both a cam member 28 extending the width of the mower and a manual screw 29 are used to increase the mechanical advantage. Cam constructions equivalent to that here disclosed will readily suggest themselves to those skilled in the art and there is shown here one form which has been found very satisfactory in actual use as exemplary of this aspect of the invention.

The cam member 28, as shown, is particularly advantageous because of its simplicity of manufacture. It may be formed of a simple length of stock steel tubing which merely has its ends machined to form accurate bearing surfaces and is deformed by flattening the under side thereof at those portions adjacent the extensions 24 of the bed knife mounting in order that it can act on the extension member 24 to rotate the knife mounting in such a manner as to reduce the clearance between the bed knife edge and the reel upon rotation of the cam member.

One advantage of this construction is that the cam shaft 28 shares with the bed knife 20 the twisting torque exerted by the screw 29 due to the fact that the adjusting force is applied all at one end. This, however, is much less important in the construction shown, where low adjusting pressure is required, than in the case of an ordinary bed knife adjustment where reaction to cut is not used or even tends to push apart the shear knives. In such case, the advantage of this construction may be enhanced by flattening the cam surface at the farther end of the shaft a little deeper or making the surface nearer the adjusting screw a little rounded, so that the twisting of the shaft is compensated for or even slightly overcompensated to correct any tendency to twist in the bed knife.

At one end this tube 28 is mounted directly in the frame, but its other end passes through an eccentric bearing sleeve 31 by rotation of which the inaccuracies which necessarily result in any simple flattening of the tube are compensated for. When the machine is assembled this eccentric 31 is rotated until a perfect simultaneous and uniform action is had on both of the projections 24. Then the sleeve is locked in position by drilling and inserting a locking pin 32 which extends partly into the frame and partly into the eccentric sleeve. The pin may be secured in place by punch pricking or spot welding.

At one end of the frame there is provided a threaded lug in which is a thumb screw 29; and on the adjacent end of the cam shaft 28 is secured a crank arm or finger 30 on which the screw 29 operates to rotate the cam shaft.

Consideration of the manner in which the present adjusting device operates will make it evident that with respect to the adjusting mechanism per se the bed knife edge is free to move toward the reel, but its motion away from the reel is restricted by the position of the adjusting elements. As a result of this method of operation each of the parts needs to make only such contact with other elements as will provide the initial positive pressure required by the type of lawn being cut. Thus, the parts are capable of acting in the manner intended with high efficiency and without undue wear, and regardless of wear which may have taken place.

As noted above, the bed knife is so mounted that the cutting of grass will result in a reaction drawing the bed knife into closer contact with the reel. The machine is, therefore, self-adjusting in that the force exerted between the contacting knives during the shearing operation is directly controlled by the type of material being cut. In preparing for use a mower embodying the features of this invention, screw 29 is turned in a direction to exert a downward turning movement on extension 30 thereby rotating cam member 28 which acts through the projections 24 on the bed knife to rotate the latter and bring its edge into closer contact with the reel. Screw 29 is turned until the bed knife barely contacts the fly knives upon rotation of the reel. This point is readily determined by rotating the reel while turning screw 29 until the first sound of contact between the knives is heard. Such a contact is barely sufficient to cut tender grass but will not give adequate cutting in heavy or tough wiry grass especially when the reel is rotated slowly. It will be noted that spring 25 maintains the bed knife mounting in such a position that the clearance between the bed knife and the spiral fly knives is at a maximum for the adjustment made by means of cam member 28. This permits one to "feel" more accurately the extent of the adjustment. However, when the mower is propelled across a lawn the rotary cutting reel rotates rather rapidly and the action of cutting exerts a turning movement upon the bed knife mounting, thereby bringing the shearing edges into closer contact and enabling the machine to cut grass, weeds and the like with a minimum of effort.

In the accompanying drawings I have shown a preferred embodiment of my invention. It should be understood that this is not intended to be either exhaustive or limiting of the invention but, on the contrary, is shown for the purpose of illustrating the invention in order that others skilled in the art may practice the same and adapt the principles thereof to the construction of any particular machine.

What I claim is:

1. In a mowing machine of the type having a frame in which are mounted a rotary cutting reel with a plurality of spiral fly knives arranged with their cutting edges in a geometric cylinder and a bed knife in shearing contact with said fly knives, said bed knife being pivotally connected to said frame with its axis of rotation below that plane of tangency to said cylinder which includes the cutting edge of said bed knife; an adjusting device for said bed knife comprising a hollow shaft of rough tube stock rotatably mounted in said frame and having two flat bottom dents on its lower side symmetrically spaced along its length and accurate bearings at its ends, an eccentric bearing sleeve at one end rotatably mounted in the frame and having the bearing at one end of said shaft mounted therein, means securing said sleeve against rotation, lateral projections from the rear of said bed knife at positions corresponding to those of said dents and having flat surfaces transverse to the direction of their rotation with the bed knife which contact with the bottom of the dents of said shaft, said shaft being positioned with its axis substantially parallel to and to the rear of the axis of rotation of the bed knife but with the eccentric bearing adjusted to bring said dents into simultaneous and uniform cam action against the corresponding flat surfaces of the projections, a lateral crank arm projection on one end of the shaft and a hand screw mounted in and projecting above the frame at the rear thereof for convenient manual operation and engaging the end of said crank arm with sufficiently high mechanical advantage due to the pitch of its screw thread and the length of the crank arm sufficient that its least friction in its screw thread will prevent its being moved by force from the bed knife acting through the crank arm but insufficient to exert force on the bed knife to injure or seriously to impair the operation of the mower when the screw is turned with any normal manual force, and resilient metal springs acting on said projections to rotate the bed knife in a direction to free its edge from the reel and to hold its projections against said shaft.

2. In a mowing machine of the type having a frame in which are mounted a rotary cutting reel with a plurality of spiral fly knives arranged with their cutting edges in a geometric cylinder and a bed knife in shearing contact with said fly knives, said bed knife being pivotally connected to said frame with its axis of rotation below that plane of tangency to said cylinder which includes the cutting edge of said bed knife; an adjusting device for said bed knife comprising a shaft rotatably mounted in said frame members with its axis of rotation substantially parallel to and to the rear of the axis of rotation of said bed knife and having on the lower side thereof, respectively in opposite halves of its length, at least two recesses from the adjacent lower surfaces of the shaft, lateral projections extending from the rear of said bed knife into said recesses respectively contacting with the shaft therein means imposing a turning moment on said shaft, and resilient means acting on at least one of said projections in a direction tending to rotate the edge of said bed knife away from said reel.

3. In a mowing machine of the type having a frame in which are mounted a rotary cutting reel with a plurality of spiral fly knives arranged with their cutting edges in a geometric cylinder and a bed knife in shearing contact with said fly knives, said bed knife being pivotally connected to said frame with its axis of rotation below that plane of tangency to said cylinder which includes the cutting edge of said bed knife and to the rear of said cutting edge, the combination therewith of adjustable means positively limiting rotation of the bed knife about its axis in a direction which would increase the distance between the edge thereof and the said cylinder, and resilient means acting on said bed knife in a direction tending to increase said distance.

4. An adjusting mechanism for a mowing machine of the type having a frame, a rotary cutting reel with a plurality of spiral fly knives and a bed knife mounted on the frame with an edge of said bed knife in contact with said reel to act in combination with each of said fly knives forming a shearing device, said mechanism comprising a pivotal mounting for said bed knife at either end thereof on said frame, a cam shaft pivotally mounted on said frame beside the bed knife, a plurality of cam follower portions on said bed knife contacting said cam shaft and exerting cam pressure thereon causing a turning moment about the bed knife pivot axis, a crank arm on said cam shaft, and a hand screw bearing against said crank arm and exerting a turning moment on said cam shaft upon operation of the hand screw thereby exerting cam pressure on said follower portions.

5. In a mowing machine of the type having a frame in which are mounted a rotary cutting reel with a plurality of spiral fly knives arranged with their cutting edges in a geometric cylinder and a bed knife in shearing contact with said fly knives, said bed knife being pivotally connected to said frame, an adjusting device for said bed knife comprising portions on the bed knife spaced along its length on opposite sides of the center thereof, each having a surface extended away from the pivotal axis and faced in the rotational direction about said axis in which the bed knife moves away from the reel, receiving cam pressure thereon causing a turning moment on the bed knife about its axis, and a cam shaft rotatably mounted in the frame and comprising a length of tubing having dents therein at positions corresponding to the positions of said projections and with surfaces which vary in radius about the rotational axis of the shaft acting as cams against said pressure surfaces of the projections.

6. In a mowing machine of the type having a frame, a rotary cutting reel mounted in the frame with a plurality of fly knives, and a bed knife pivotally mounted in the frame with its edge contacting the fly knives to form a shear therewith, the combination with the bed knife of means for pivotally mounting the bed knife on an axis which is angularly spaced from the reel axis about the cutting edge of the bed knife in the same direction as the direction of rotation of the reel by an angle of which the tangent has a positive sign, whereby any resistance to cutting by material engaged between a fly knife and the bed knife will produce a reaction on the bed knife tending to push it tighter against the reel, and manually adjustable means positively limiting the pivotal movement of the bed knife away from the reel, said means being adjustable to a minimum pressure of the shearing edge of the bed knife against the reel sufficient only for a relatively unresisting cut, and the bed knife being free to rotate therebeyond to produce greater pressure by reaction to the cutting of heavier materials.

7. The combination as defined in claim 6, in which the bottom shearing edge of the bed knife is not substantially above the lowest part of the reel.

8. The combination as defined in claim 6, which further includes resilient means pressing the bed knife away from the reel and against said limiting means with a force which is easily overcome by manual adjustment of the limiting means, and by the reaction to cutting of heavier materials.

9. The combination as defined in claim 6, in which the limiting means is provided with a single manual adjustment.

10. In a mowing machine of the type having a frame, a rotary cutting reel mounted in the frame with a plurality of fly knives, and a bed knife pivotally mounted in the frame with its edge adapted to contact the fly knives to form a shear therewith close to the bottom of the reel, the combination with the bed knife of means pivotally mounting the bed knife on an axis which is angularly spaced from the reel axis about the cutting edge of the bed knife in the same direction as the direction of rotation of the reel by an angle of which the tangent has a positive sign whereby any resistance to cutting by material engaged between a fly knife and the bed knife will produce a reaction on the bed knife tending to push it tighter against the reel, and adjustable stop means engaging the bed knife at points spaced toward opposite ends from the center of its length and limiting its pivotal movement away from the cutting reel and distributing to said points a minimum pressure for holding the bed knife against the cutting reel, but leaving said bed knife free to rotate into tighter engagement with said reel, a handle adjusting said stop means, and means transmitting force from the handle to said stop means with high mechanical advantage, whereby said handle may be adjusted without use of tools and will maintain adjustment against the pressures and vibrations to which the bed knife is subjected.

RICHARD D. CLEMSON.